Nov. 15, 1966  R. E. ROPER  3,285,490
APPARATUS FOR MAKING TUBULAR MEMBERS
Filed June 25, 1963  6 Sheets-Sheet 1
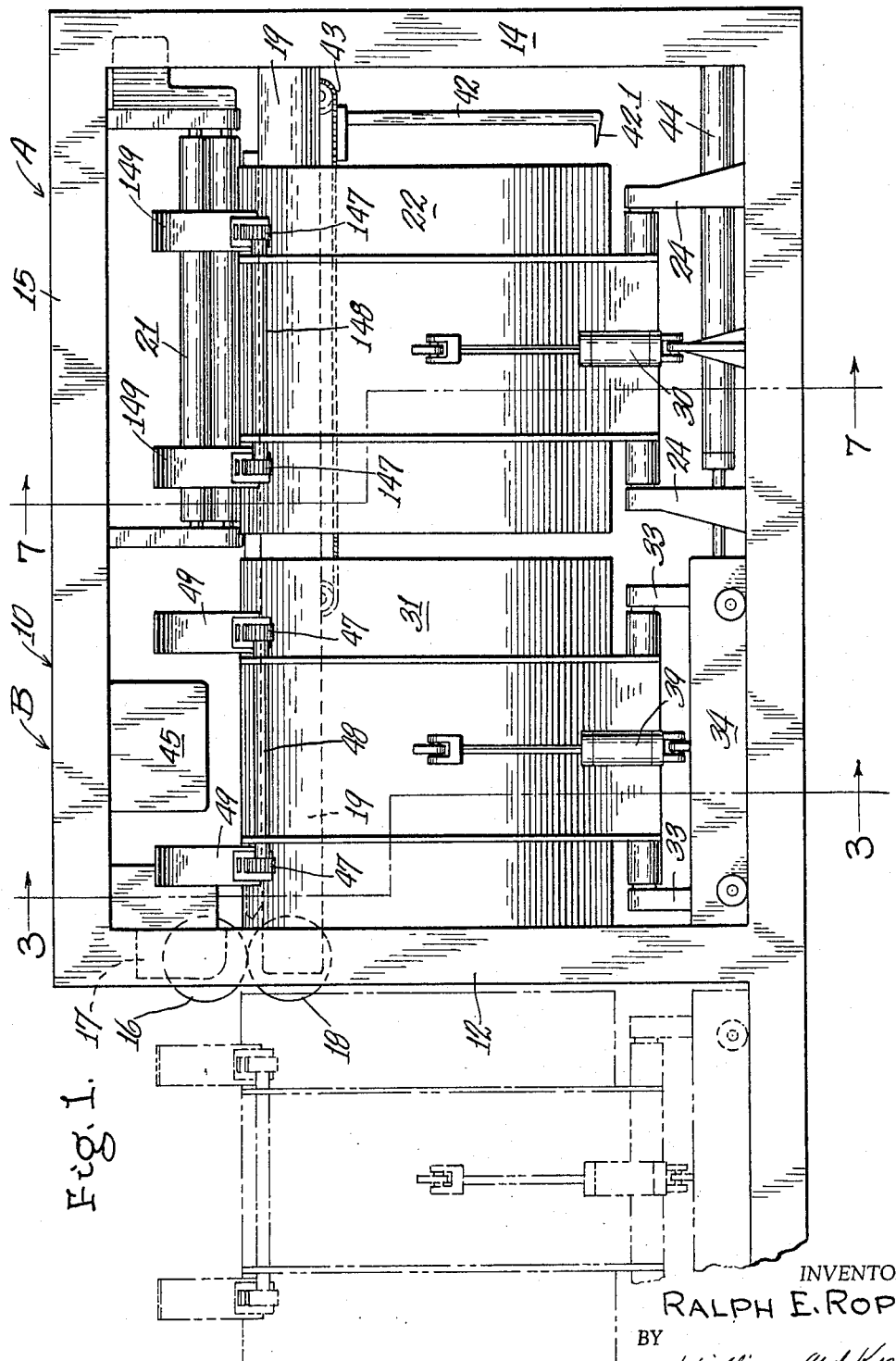
INVENTOR.
RALPH E. ROPER
BY
Williams and Kreske
ATTORNEYS Nov. 15, 1966   R. E. ROPER   3,285,490
APPARATUS FOR MAKING TUBULAR MEMBERS
Filed June 25, 1963   6 Sheets-Sheet 2
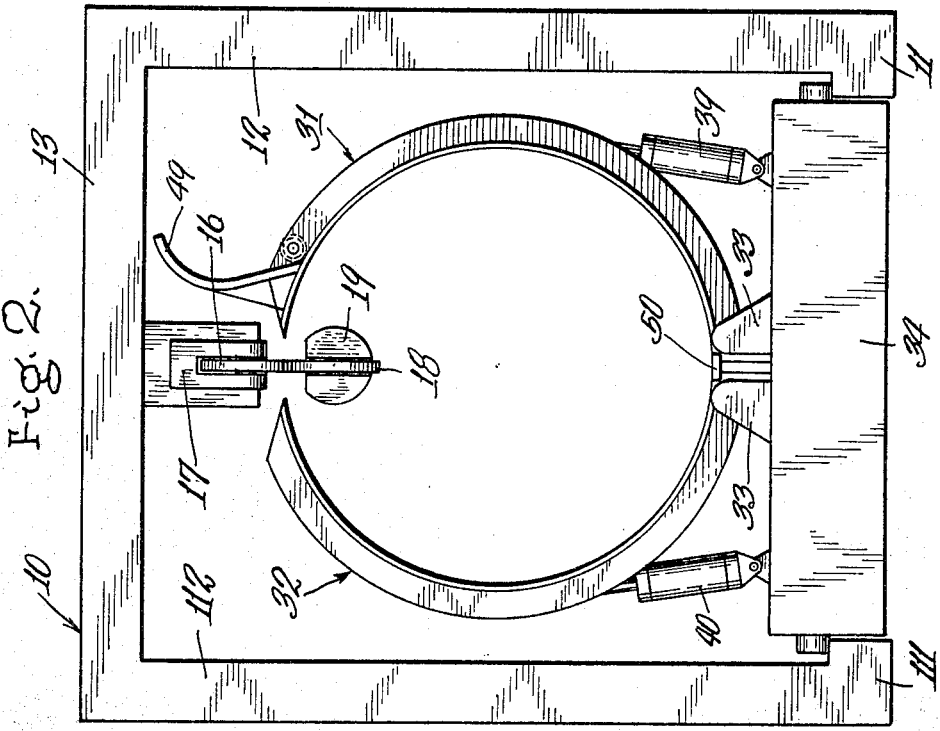
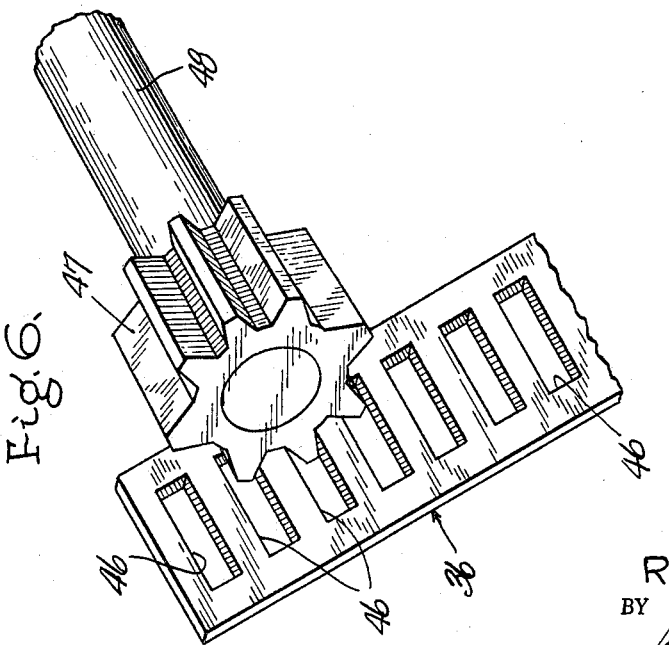
INVENTOR.
RALPH E. ROPER
BY Williams and Kreske
ATTORNEYS

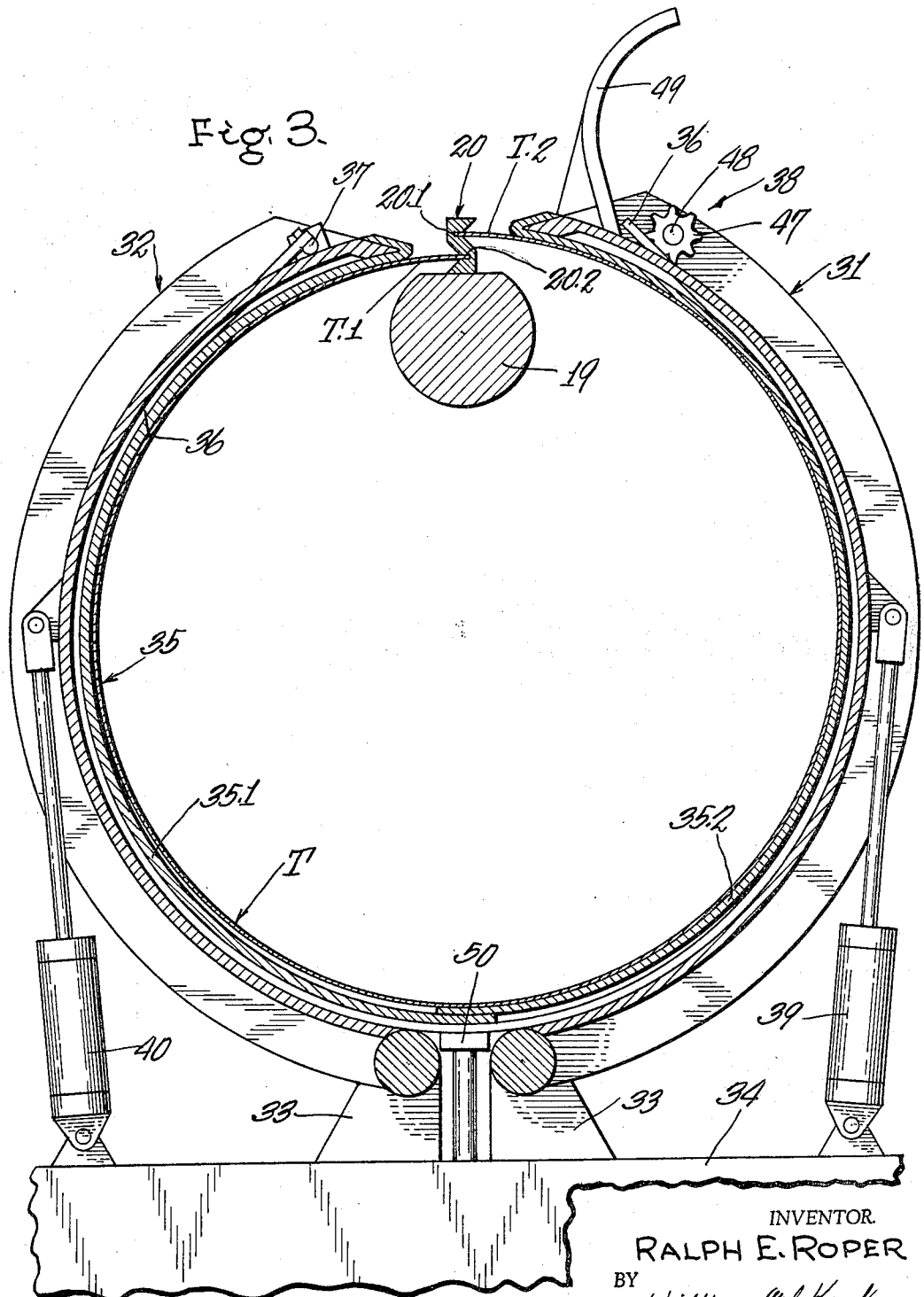

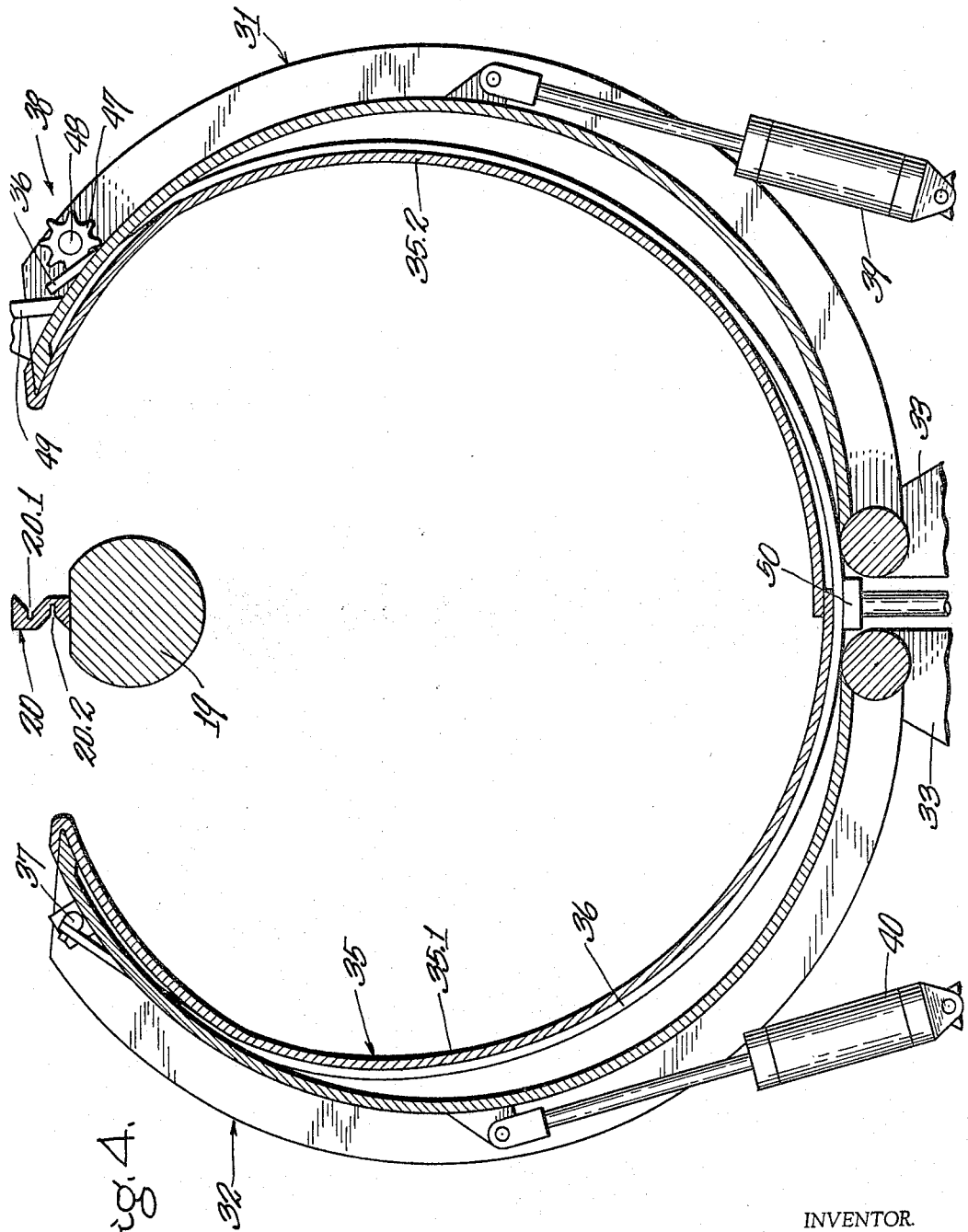

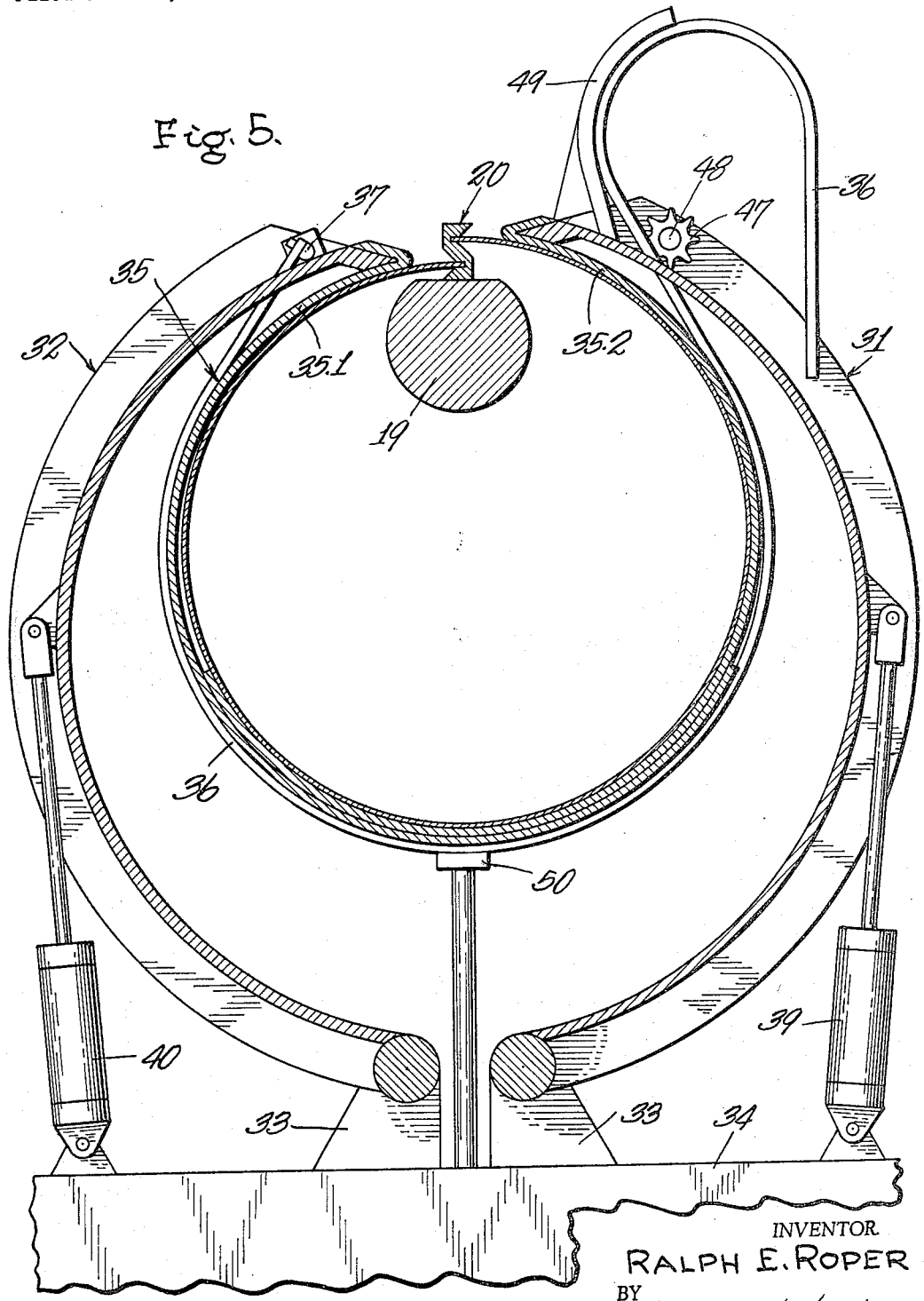

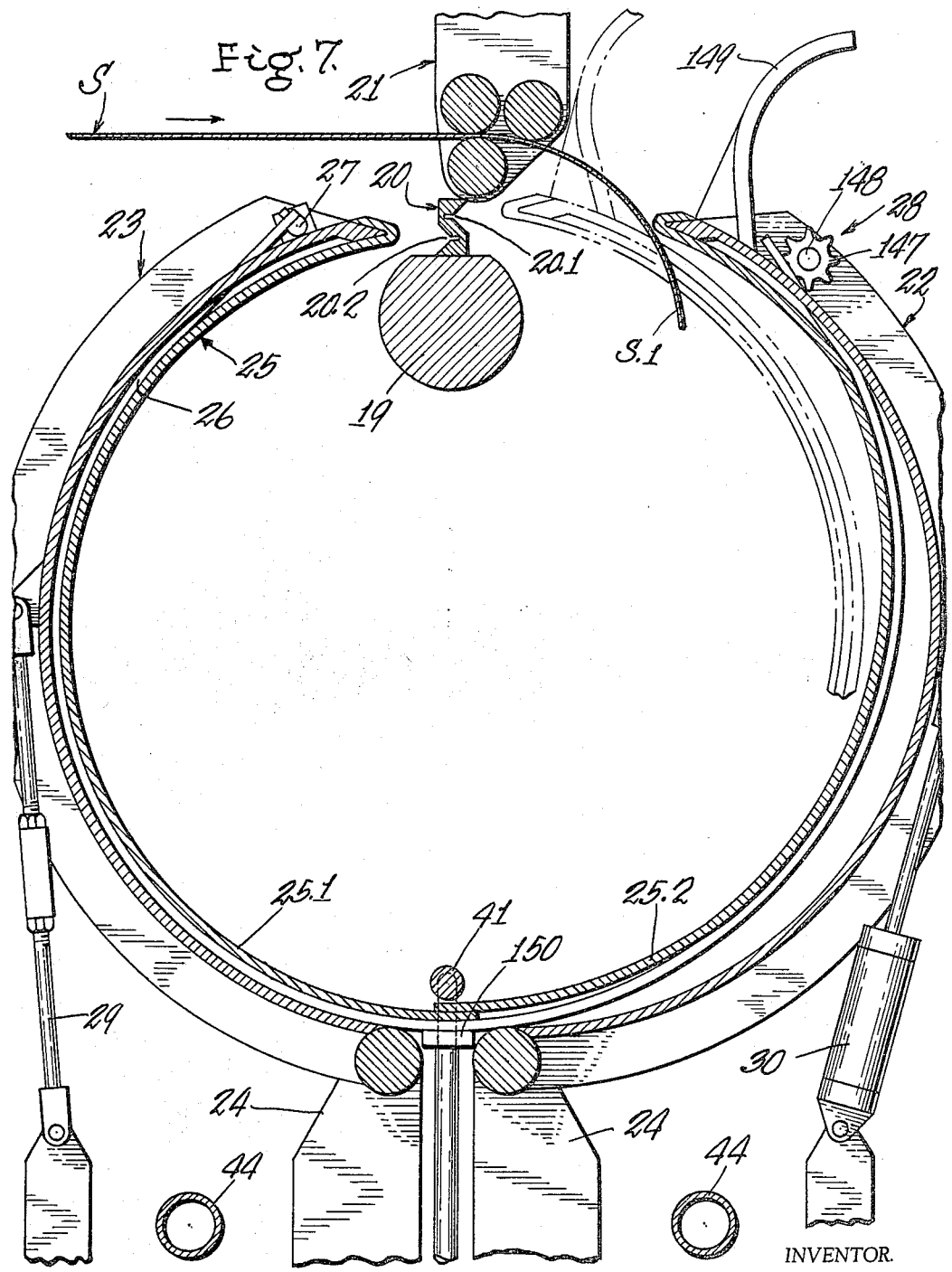

United States Patent Office 3,285,490
Patented Nov. 15, 1966

3,285,490
APPARATUS FOR MAKING TUBULAR MEMBERS
Ralph E. Roper, Indianapolis, Ind., assignor to Wallace Expanding Machines, Inc., Indianapolis, Ind.
Filed June 25, 1963, Ser. No. 290,469
6 Claims. (Cl. 228—15)

The present invention relates to apparatus for making tubular members from flat sheet material, and especially to that portion of the apparatus which holds the tubular members in the desired shape during certain operational sequences, and the principal object of the invention is to provide new and improved apparatus of the character described.

In the making of tubular members from flat sheet material, it has long been common practice to roll up a piece of flat sheet to form a longitudinally split body, and to then join the body edges defining the body split by welding or the like. Following formation of the tubular body and before welding of its edges aforesaid, such edges are usually held in proper relative position by means of a slotted bar in which they are disposed. Normally, the split, tubular body depends from and is supported by the slotted bar until welded. For a specific example of such prior art apparatus, reference may be had to Letters Patent No. 2,771,046, issued November 20, 1956, to Arthur L. Williams and Donald F. Brace, and entitled, Apparatus for Producing Tubular Members.

The present invention is well suited for resistance welding of the split edges of a tubular body formed by rolling a flat piece of sheet metal to tubular shape, the rolled sheet directly entering a first confining member where the edges are engaged in a Z-bar for alignment with the welding pass. The formed body is then transferred to a second confining member, and the latter is movable relative to the weld wheels so that the edges of the body are welded. Of great utility is the fact that both confining members are adjustable in transverse size so as to accommodate for tubular bodies of various sizes.

While prior art apparatus has been satisfactory for most purposes, it has been unsuitable where relatively large diameter tubular bodies are to be formed of relatively thin sheet material. For example, apparatus constructed in accordance with the present invention is designed to form tubular bodies of more than 50 inches in diameter from sheet metal having a thickness of .035 inches. Another advantage of the present invention is the ease with which adjustments may be made for tubular bodies of various diameters. These and other advantages will readily become apparent from a study of the following description and from the drawings appended hereto.

In the drawings accompanying this specification and forming a part of this application there is shown, for purpose of illustration an embodiment which the invention may assume, and in these drawings:

FIGURE 1 is a side elevational view of apparatus embodying the present invention, FIGURE 2 is an end elevational view of the apparatus as seen in FIGURE 1, FIGURE 3 is an enlarged, fragmentary sectional view generally corresponding to the line 3—3 of FIGURE 1, FIGURE 4 is a view similar to FIGURE 3 but with certain parts disposed in other positions, FIGURE 5 is a view similar to FIGURE 3 but with certain parts adjusted to accommodate a smaller diameter tubular body, FIGURE 6 is an enlarged fragmentary perspective view of certain details, and FIGURE 7 is an enlarged, fragmentary sectional view generally corresponding to the line 7—7 of FIGURE 1.

With reference to FIGURES 1 and 2, apparatus illustrating the invention presently comprises a frame structure 10 formed of a pair of base members 11, 111 is spaced, side-by-side relation and providing respective upright, front frame members 12, 112 connected together at their upper ends by a front cross-member 13. Similarly, each base member has an upright rear frame member 14, the upper ends of which are also connected together by a cross-member. Additionally, the upper ends of the upright frame members are connected together by members 15 spaced above and paralleling respective base members. For a purpose to appear and as shown in FIGURE 1, base members 11 project forwardly some distance beyond the front upright frame members. As will be understood, the various frame members hereinabove discussed will preferably be bolted, welded, or otherwise secured together to form a rigid support for the apparatus portions later to be described.

Referring to FIGURE 1, the present apparatus may conveniently be divided into a body forming station A adjacent the rear of the frame structure and a body welding station B adjacent the front of the frame structure.

Turning first to the body welding station, the latter comprises an upper roller electrode 16 mounted on the front cross-member 13 by a suitable slide mechanism 17 which provides for vertical electrode movement and a lower roller electrode 18 mounted on the free end of an arm 19 whose opposite end is secured to the rear or right, of the frame structure 10. Although not shown, one or both of the electrodes 16, 18 will have associated therewith suitable drive means for effecting electrode rotation in the directions indicated.

As best seen in FIGURES 3 and 7, a Z bar 20 is secured to the upper surface of the lower electrode supporting arm 19 and extends from the body forming station A to a point just short of the roller electrodes 16, 18. As illustrated, Z bar 20 has opposed, vertically spaced, longitudinally extending slots 20.1, 20.2 for a purpose to appear.

With reference to FIGURES 1 and 7, forming station A is provided with a set of rotatable forming rolls 21 through which a sheet of metal or the like may be fed in the direction indicated in FIGURE 7. Such rolls may be similar to those disclosed in the patent hereinabove mentioned and are designed to bend an incoming sheet S downwardly to provide a tubular body encircling the previously mentioned arm 19. The arrangement is such that when the sheet has passed through the forming rolls, its leading end S. 1 will be seated in the Z bar slot 20.2 while its trailing end S. 2 will be seated in the bar slot 20.1.

For guiding the sheet S to engagement with the Z bar slots, and for supporting the tubular body into which the sheet is formed in position about the arm 19, forming station A is provided with a pair of semi-circular shoes 22 and 23 in opposed relation whose lower ends are pivoted to the frame 10 by means of a suitable bracket structure 24 and whose upper ends are adjacent the Z bar 20. Attached to the free upper ends of the shoes 22, 23 is a flexible, sheet metal liner 25 which provides a loop for receiving and confining the tubular body. For reasons later to appear, liner 25 is formed to two, overlapping pieces and underlying the liner are a pair of longitudinally spaced, flexible support bands 26, each of which has one end pivotally attached to the upper end of shoe 23 at 27 and the other end of each being attached to the upper end of shoe 22 by a structure 28 later to be described in detail.

Shoe 23 is adapted to be held in the approximate position illustrated in FIGURE 7 by a strut 29 whose length may be adjusted to move the upper end of the shoe toward and away from the Z bar 20 as may be required. On the other hand, a fluid cylinder 30 is pivotally connected to the shoe 22 for shifting the latter from the full line position seen in FIGURE 7 to the phantom line position shown.

Turning now to the welding station B and with reference to FIGURES 1, 2 and 3, a pair of semi-circular shoes 31, 32 are disposed in axially aligned, end-to-end relation with the shoes 22, 23. Shoes 31, 32 are substantially identical to those previously described; however, they are not pivotally mounted directly on the frame 10 but are pivoted by a bracket structure 33 to a carriage 34 which is movable along the base members 11, 111 from the full line position seen in FIGURE 1 to the phantom line position for reasons to appear.

Shoes 31, 32, as seen in FIGURE 3, also support a two-piece, sheet metal liner 35 from their upper ends and underlying and supporting the liner are two flexible support bands 36, each having one end pivotally attached to the upper end of shoe 32 at 37 and its other end attached to the upper end of shoe 31 by a structure 38. It is to be understood that while both of the liners 25, 35 and their supporting bands 26, 36 have been shown in the drawings to be of considerable thickness, this has been done only for purpose of illustration and in actual practice such parts will be relatively thin sheet metal for maximum flexibility.

Pivotally attached to the shoe 31 is a fluid cylinder 39 and attached to the shoe 32 is a similar cylinder 40, such cylinders being operable to shift the shoes 31, 32 between the positions seen in FIGURE 3 and the positions seen in FIGURE 4 for a purpose to appear.

With the construction thus far described and with the parts positioned seen in full lines in FIGURES 1 and 7, operation will be as follows: A sheet S of the correct length for the tubular body to be formed will be fed through the forming rolls 21, the leading end S. 1 of the sheet curving downwardly to pass inside the shoe 22 which is being held in the full line position shown by the fluid cylinder 22. As more of the sheet S is fed through the forming rolls, its leading end will slide around the liner 25 and will be guided thereby to enter the Z bar slot 20.2. To reduce friction of the sheet as it is fed around the liner 25, a roller 41 may be provided at the lower portion of the liner and over which the sheet may pass. As the trailing end of the sheet leaves the forming rolls it will either spring into the Z bar slot 20.1 or will be forced thereinto upon movement of the shoe 22 to its phantom line position by the cylinder 30. With the shoe 22 in its phantom line position, the longitudinally split, tubular body into which the sheet is now formed will be firmly supported with the body ends defining the body split firmly held in the respective Z bar slots.

With the carriage 34 in the full line position seen in FIGURE 1 and with the shoes 31, 32 opened as seen in FIGURE 4, the tubular body will be shifted axially along the Z bar and between the shoes 31, 32. While any suitable means may be employed for thus shifting the tubular body, a pusher bar 42 (see FIGURE 1) may conveniently be attached to the lower reach of a chain 43 carried by the rear portion of the arm 19 for movement about suitable sprockets. Clearly, upon movement of the lower chain reach to the left, pusher bar 42 will force the tubular body from between the shoes 22, 23 and to a position between the shoes 31, 32. As herein illustrated, the lower end of bar 42 may have an off-set foot portion 42.1 for engaging beneath the tubular body.

After the tubular body has been transferred between the shoes 31, 32, the latter will be shifted by means of respective cylinders from their open positions seen in FIGURE 4 to their closed positions seen in FIGURE 3 wherein the tubular body T is firmly gripped by the liner 35 to maintain the body in its desired tubular shape with its split ends T. 1, T. 2 in Z bar slots 20.2, 20.1, respectively.

With the tubular body thus gripped by the liner 35 of the shoes 31, 32, carriage 34 will be shifted from the position seen in full lines in FIGURE 1 past the rotating roller electrodes 16, 18 to the position seen in phantom lines. While any suitable means may be employed for shifting the carriage, the present construction employs a pair of fluid cylinders 44 (see also FIGURE 7) which are adapted to move the carriage at a linear rate approximately equal to the peripheral speed of rotation of the roller electrodes. As the split ends T. 1, T. 2 of the tubular body are passed between the roller electrodes, such ends will be forced together in overlapping relation thereby whereupon the passage of welding current from a transformer 45 between the electrodes and through the overlapped body ends will weld such ends together.

Following the welding operation, the shoes 31, 32 will once again be opened to the positions seen in FIGURE 4 to permit removal of the completed tubular body and the carriage 34 will then be returned to its full line position seen in FIGURE 1 to await its next cycle of operation. During the welding operation aforesaid, pusher 42 will preferably be returned to the position seen in FIGURE 1 and another sheet will be fed through the forming rolls 21 as previously described.

It is an important feature of the present invention and a great step forward in the art that the present apparatus is readily adjustable to form, transfer and weld tubular bodies smaller in transverse size than those thus far disclosed. It is primarily for this purpose that the liners 25, 35 are each formed of two overlapping pieces, as previously mentioned, rather than from a single piece. FIGURE 5, which is analogous to FIGURE 3, illustrates how the liner 35 may be adjusted to a smaller size to accommodate a smaller tubular body and as earlier stated, liner 35 is formed of two pieces 35.1 and 35.2 Liner piece 35.1 has its upper end secured to the upper end of shoe 32 in any suitable manner while the liner piece 35.2 has its upper end secured to the upper end of shoe 31. The lower ends of the liner pieces overlap, as shown, a greater or lesser amount depending upon the size of the tubular body to be accommodated. Also as previously mentioned, liner 35 is supported by a pair of bands 36 each having one end pivotally secured to shoe 32 at 37 and each having its other end secured to the shoe 31 by a structure 38. Since the band ends are secured to the exterior of the shoes, the latter are suitably slotted, not shown, to pass respective band ends.

As best seen in FIGURE 6, the band end secured to shoe 31 is preferably formed with a series of openings 46 for passing the teeth of respective pinions 47 suitably journaled on the shoe 31. Preferably, pinions 47 will be secured to the same shaft 48 for simultaneous rotation. The arrangement is such that simultaneous rotation of the pinions 47 will shorten or lengthen the effective lengths of the bands 36, depending upon the direction of pinion rotation, thus decreasing or increasing the effective size of the liner 35. Although not shown, any suitable means may be employed to effect pinion rotation and to retain the pinions against rotation in their desired adjusted positions. In order to insure that the band ends are clear of the Z bar when the bands are shortened as seen in FIGURE 5, a guide 49 may be provided to turn the free end of each band over, away from the Z bar, as illustrated.

As earlier pointed out, the liner 35 and the bands 36 are quite flexible and thus cannot be relied upon to maintain the circular shape shown when they are adjusted for smaller than maximum size tubular members. Accordingly, and to insure maintenance of the liner in such circular shape, a vertically adjustable support 50 preferably underlies each band 36. Although not shown, any suitable means may be employed for simultaneously raising and lowering the supports 50 and for retaining them in the desired adjusted positions.

Since the liner 25 of the forming station A is similar to liner 35, being formed of two overlapped pieces 25.1 and 25.2, and since the bands 26 are likewise similar to bands 36, a detailed description thereof and their operation in accommodating various sizes of tubular bodies is deemed to be unnecessary. It will be noted, however, that other similar associated parts are identified with the same reference characters hereinbefore employed with respect to the parts supported on the carriage 34 but with the prefix 1 added. Thus, the pinions engaged with the bands 26 are identified as 147, the band guides are identified as 149 and the band supports are identified as 150. With respect to the supports 150, it is to be noted that the previously mentioned roller 41 at the bottom of the liner 25 may conveniently be supported by supports 150 through a suitable bracket structure whereby such roller will be properly positioned with respect to the liner at all adjusted sizes thereof.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. Apparatus for supporting a longitudinally split, tubular body preparatory to joining the body edges defining the body split, comprising a first loop of sheet material embracing the split body and generally corresponding to the size and shape of body desired, said first loop being formed of two, flexible sheet member pieces in overlapping relation, a transversely flexible second loop underlying and supporting said first loop, and means for varying the effective length of said second loop to vary the amount of overlap of said sheet member pieces thus varying the size of said first loop to provide for accommodation of bodies of different transverse sizes.

2. The apparatus of claim 1 wherein means underlies and supports the lower portion of said first loop to maintain the desired loop configuration.

3. The apparatus of claim 2 wherein said underlying and supporting means is vertically adjustable for cooperation with said first loop at various adjusted sizes thereof.

4. Apparatus for making tubular members from flat sheet material, comprising means for forming a sheet of material to provide a longitudinally split, tubular body, joining means spaced from said forming means for securing together the body edges defining the body split, a first arcuate member adjacent said forming means for receiving and confining the tubular body formed thereby, a second arcuate member generally coaxial with said first for receiving a tubular body, means for axially shifting a tubular body from said first arcuate member to said second, a carriage mounting said second arcuate member and shiftable from a position adjacent said forming means to carry a tubular body supported thereby past said joining means for securement of said body edges together, said arcuate members each being formed of two transversely flexible, arcuate sheet member pieces in overlapping relation, and means for varying the overlaps of the pieces of each arcuate member to thereby vary the transverse size of such member and accommodate it for bodies of different transverse sides.

5. The apparatus of claim 4 wherein eacch arcuate member comprises a loop of sheet material formed of two arcuate sheet member pieces in overlapping relation and wherein the size of each loop is varied by varying the amount of overlap of its pieces aforesaid.

6. The apparatus of claim 5 wherein transversely flexible second loop means underlies and supports respective sheet material loops and wherein the amount of overlap of said sheet member pieces is varied by varying the effective length of said second loop means.

References Cited by the Examiner

UNITED STATES PATENTS

| 1,368,683 | 2/1921 | Anderson | 269—130 |
| 2,155,705 | 4/1939 | Gottwald | 269—288 |
| 2,818,913 | 1/1958 | Twiford | 157—1.21 |
| 2,977,995 | 4/1961 | Walpole | 269—130 |
| 3,015,692 | 1/1962 | Herrington | 269—130 |

FOREIGN PATENTS 101,826   8/1937   Australia.

JOHN F. CAMPBELL, Primary Examiner.

M. L. FAIGUS, Assistant Examiner.